United States Patent [19]

Icking

[11] Patent Number: 4,974,448

[45] Date of Patent: Dec. 4, 1990

[54] ELECTRODES FOR MEASURING THE LEVEL OF MILK IN FLOWMETERS

[75] Inventor: Friedrich Icking, Oelde, Fed. Rep. of Germany

[73] Assignee: Westfalia Separator AG, Oelde, Fed. Rep. of Germany

[21] Appl. No.: 381,221

[22] Filed: Jul. 18, 1989

[30] Foreign Application Priority Data

Jul. 23, 1988 [DE] Fed. Rep. of Germany ....... 3825112

[51] Int. Cl.$^5$ .......................... A01J 7/00; G01F 23/22
[52] U.S. Cl. ...................................... 73/304 R; 73/223
[58] Field of Search ............. 73/304 R, 323; 340/606, 340/607, 608, 609

[56] References Cited

U.S. PATENT DOCUMENTS

| | | | |
|---|---|---|---|
| 1,587,782 | 6/1926 | McNeal | 340/607 X |
| 1,762,220 | 6/1930 | Faber | 73/304 R |
| 2,230,137 | 1/1941 | Ewertz | 73/304 R |
| 2,828,479 | 3/1958 | Jackson, Jr. | 340/606 X |
| 3,216,251 | 11/1965 | Hansen | 73/223 |
| 3,279,379 | 10/1966 | Klyce | 73/304 R X |
| 4,304,132 | 12/1981 | Snaper | 73/304 R |

Primary Examiner—Daniel M. Yasich
Attorney, Agent, or Firm—Sprung, Horn, Kramer & Woods

[57] ABSTRACT

Electrodes for measuring the level of milk flowmeters and positioned together in a holder of a non-conductive material that extends tight through the bottom of the flowmeter with their active surfaces vertically separated. The electrodes are adjacent pins with their cylindrical surfaces inside the milk flowmeter completely surrounded by the holder to the extent that only the faces of the electrodes are active.

3 Claims, 1 Drawing Sheet

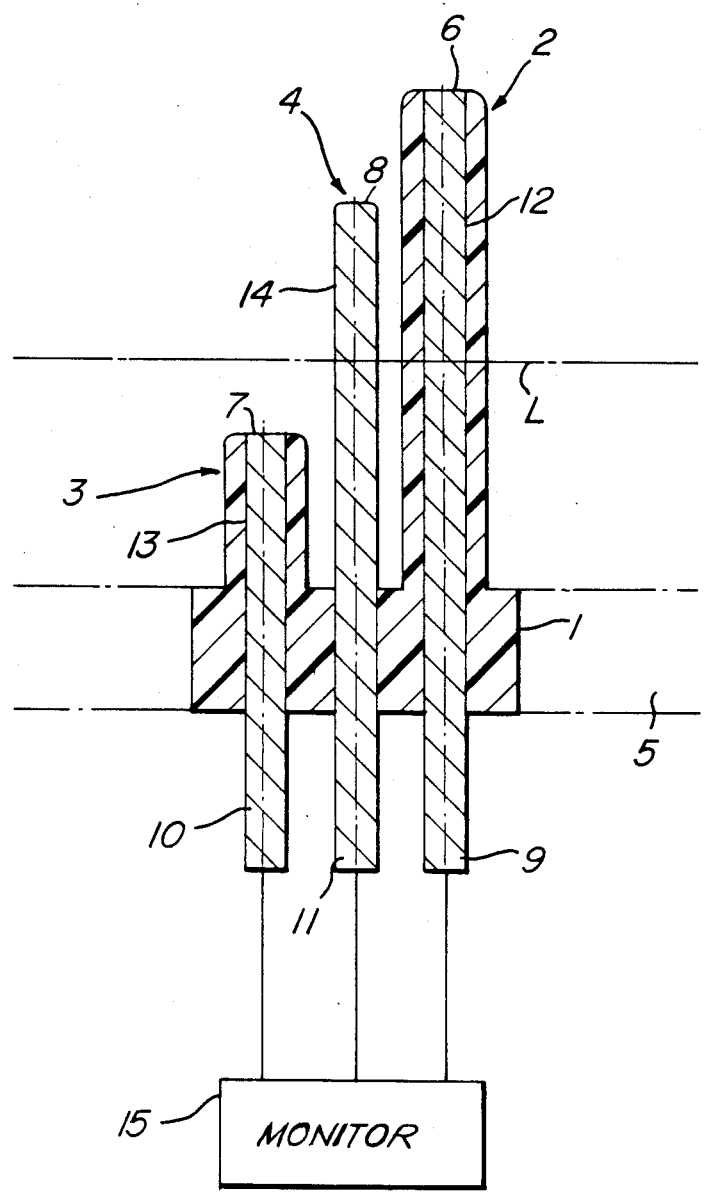

ELECTRODES FOR MEASURING THE LEVEL OF MILK IN FLOWMETERS

BACKGROUND OF THE INVENTION

The invention concerns electrodes for measuring the level of milk in flowmeters and positioned together in a holder of a non-conductive material that extends tight through the bottom of the flowmeter with their active surfaces vertically separated.

Electrodes of this type are known for example from U.S. Pat. No. 4,386,523. Reacting to changes in the level of milk in the flowmeter, they activate a valve body that opens or closes an outlet in the bottom of the flowmeter in accordance with the level. When the level of milk, which always changes between the two electrodes, is employed to compute the flow of milk, the electrodes must emit a signal whenever the milk is at precisely the same level. The electrodes in the known flowmeter are annular. It has been demonstrated that such electrodes do not always react to precisely the same level because their triggering point or triggering height is not precisely defined in that a certain section of the surface must be contacted by the liquid before a signal can be emitted. Furthermore, organic, inorganic and mineral constituents of the milk can form deposits on the surface of the electrodes and vary their transitional resistance and accordingly the triggering height. Electrodes of the aforesaid type also require complicated holders.

Straight electrodes partly enclosed in insulation have also been employed. A ring of liquid can be left, as a result of adhesion or cohesion for example, at the transition between the insulated and uninsulated surface and change the triggering height. These electrodes are also subject to deposits that contaminate the results.

SUMMARY OF THE INvENTION

The object of the present invention is to improve the aforesaid electrodes in order to increase their precision and make them easier to manufacture.

This object is attained by the improvement wherein the electrodes are adjacent pins with their cylindrical surfaces inside the milk flowmeter completely surrounded by the holder to the extent that only the faces of the electrodes are active.

It has surprisingly been discovered that electrodes designed in this way will always emit the same signal when the milk is at the same level. No signal will be emitted until the rising liquid reaches the butt level of the associated electrode. Even a very thin film of milk will close the circuit.

Electrodes in the form of adjacent pins are very simple in design and can be mounted very easily in an injection-molded plastic holder. Since the connections for the electric lines remain outside the holder, no wires need to extend through it as in the known embodiment.

The holder in one advantageous embodiment also accommodates a ground electrode in the form of a pin with its cylindrical surface exposed. This is of particular advantage when the whole milk flowmeter is made of plastic.

The ground electrode can be long enough for its face to be between the faces of the other electrodes, and its free surface can commence below their faces.

BRIEF DESCRIPTION OF THE DRAWING

The invention will now be described in detail with reference to the Figure, which is a schematic representation of the electrodes.

DETAILED DESCRIPTION OF THE INVENTION

A holder 1 accommodates adjacent electrodes 2 and 3 and ground electrode 4. The holder extends through the bottom 5 of the milk flowmeter such that the active faces 6, 7 and 8 of electrodes 2, 3 and 4 are inside the flowmeter having milk level L therein and their electric connections 9, 10 and 11 to monitor 15 are outside it. The surfaces 12 and 13 of electrodes 2 and 3 are completely enclosed by holder 1, leaving only their faces 6 and 7 active. The surface 14 of ground electrode 4 on the other hand is completely exposed and hence totally active.

The end face 8 of the ground electrode 4 is at a height between the other electrode end faces 6 and 7. The exposed cylindrical surface 14 extends below the height of the end faces 6,7 of the other electrodes 2,3.

In operation, the signal emitted by the electrodes to monitor 15 will always be the same when the milk is at the same level. Moveover, no signal will be emitted as long as the level L is below face 7. As soon as level l rises above face 7, even a thin film of milk will connect electrodes 3 and 4. This connection will continue as long as the level remains above face 7. No connection will occur between electrodes 2 and 3 and 2 and 4 until the liquid level L rises to above face 6.

It will be appreciated that the instant specification and claims are set forth by way of illustration and not limitation, and that various modifications and changes may be made without departing from the spirit and scope of the present invention.

What is claimed is:

1. An electrode assembly for measuring milk levels in a flowmeter, comprising: electrodes comprising electrically conductive pin-shaped members with insulated cylindrical surfaces and planar end faces; and a holder for mounting the electrodes in a bottom wall of a flowmeter with the electrodes projecting thereabove and said holder composed of an electrically non-conductive material fixing the electrodes spaced apart and parallel with the end faces at different heights above the bottom wall when mounted in the flowmeter, wherein the electrically non-conductive material of the holder completely surrounds the cylindrical surfaces of said electrodes and extends above the bottom wall when mounted with only the planar end faces of the electrodes exposed to liquid.

2. The assembly according to claim 1, further comprising a pin-shaped ground electrode fixed in the holder with its cylindrical surface exposed.

3. The assembly according to claim 2, wherein the end face of the ground electrode is at a height between the other electrode end faces and wherein the exposed cylindrical surface of the ground electrode extends below the height of the end faces of the other electrodes.

* * * * *